United States Patent
Nolan et al.

(10) Patent No.: US 7,281,056 B1
(45) Date of Patent: Oct. 9, 2007

(54) ASSIGNING A DEVICE TO A NETWORK

(75) Inventors: John Nolan, Sacramento, CA (US); Kenneth C. Duisenberg, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 470 days.

(21) Appl. No.: 10/163,290

(22) Filed: Jun. 4, 2002

(51) Int. Cl.
*G06F 15/16* (2006.01)

(52) U.S. Cl. ...................... 709/232; 709/233

(58) Field of Classification Search ............... 709/220, 709/230; 717/121; 370/392, 401, 252, 276
See application file for complete search history.

(56) References Cited

U.S. PATENT DOCUMENTS

| | | | |
|---|---|---|---|
| 6,335,935 B2 * | 1/2002 | Kadambi et al. | 370/396 |
| 6,553,232 B1 * | 4/2003 | Shaffer et al. | 455/440 |
| 6,629,145 B1 * | 9/2003 | Pham et al. | 709/230 |
| 6,658,010 B1 * | 12/2003 | Enns et al. | 370/401 |
| 6,813,268 B1 * | 11/2004 | Kalkunte et al. | 370/392 |
| 6,813,648 B1 * | 11/2004 | Perona et al. | 710/8 |
| 6,859,825 B1 * | 2/2005 | Williams | 709/220 |
| 6,901,580 B2 * | 5/2005 | Iwanojko et al. | 717/121 |

* cited by examiner

*Primary Examiner*—Kenny Lin

(57) ABSTRACT

Techniques are provided for assigning a device to a desired network. In one embodiment, the device is connected via a network switch to the network. A value of a configurable parameter corresponds to a data speed that would be used to transfer the data between the device and the network. To assign the device to the network, the value of the parameter corresponding to a desired speed is set in the network circuitry of the device. The network switch, interfaces with the device, detects the speed, and, based on this speed, assigns the device to a corresponding network. Additionally, the switch can assign the data duplex based on a value of a configurable duplex parameter set in the network circuitry.

16 Claims, 4 Drawing Sheets

ASSIGNING A DEVICE TO A NETWORK

FIELD OF THE INVENTION

The present invention relates generally to networks and, more specifically, to assigning a device to a network.

BACKGROUND OF THE INVENTION

Nowadays, it is very common for an electronic device such as a computer to be connected to a network including a local area network (LAN), which spans a relatively small area, e.g., a building, a group of buildings, etc. Typically, the computer includes a network card or network circuitry to be connected to a network switch, and thus a network. The computer, usually via the network card, includes speed options such as 10Base-T, 100Base-T, 1000Base-T, etc., to transfer data at different speeds. A 10Base-T system supports data speed at up to 10 megabits per second; a 100Base-T system supports data at up to 100 megabits per second; and a 1000Base-T system supports data at up to 1 gigabit per second. In some approaches, the switch sets the transfer rate to the highest speed advertised by the computer. For example, if the computer advertises that it can support both 10 and 100Base-T, and if the switch can support both 10 and 100Base-T, then the switch sets the speed to 100Base-T. However, in one approach, once the computer is set to a particular speed, it is assigned to a network of the same speed and cannot communicate with a computer or another device in another network of a different speed. For example, if the computer is set to 100Base-T, it is assigned to a "100BaseT" network and can only communicate with devices in this of 100Base-T network, but cannot communicate with devices in a different network, e.g., a "10Base-T" network. Similarly, when the computer is set to 10Base-T, it is assigned to a 10Base-T network and cannot communicate with other devices in the 100Base-T network. A bridge or similar mechanisms connecting two different networks can allow devices in the two different networks to communicate with one another. However, such a solution usually requires extra hardware and associated costs.

A full duplex system that transfers data between two parties allows both parties to concurrently transmit the data while a half duplex system allows only one party to transmit the data at a time. In many situations, the switch forces a default duplex to the computer, and the computer has no choice but to operate at such a forced duplex. For example, the switch forces a computer to be half-duplex and 10Base-T if the computer does not enable its auto-negotiate option.

Based on the foregoing, it is desirable that mechanisms be provided to solve the above deficiencies and related problems.

SUMMARY OF THE INVENTION

The present invention, in various embodiments, provides techniques for assigning a device to a desired network. In one embodiment, the device is connected via a network switch to the network. A value of a configurable parameter corresponds to a data speed to be used in transferring the data between the device and the network. To assign the device to the network, the value of the parameter corresponding to a desired speed is set in the network circuitry of the device. The network switch interfaces with the device, detects the speed, and, based on this speed, assigns the device to a corresponding network. Additionally, the switch can assign the data duplex based on a value of a configurable duplex parameter set in the network circuitry.

BRIEF DESCRIPTION OF THE DRAWINGS

The present invention is illustrated by way of example in the figures of the accompanying drawings in which like reference numerals refer to similar elements and in which.

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Figure 1:
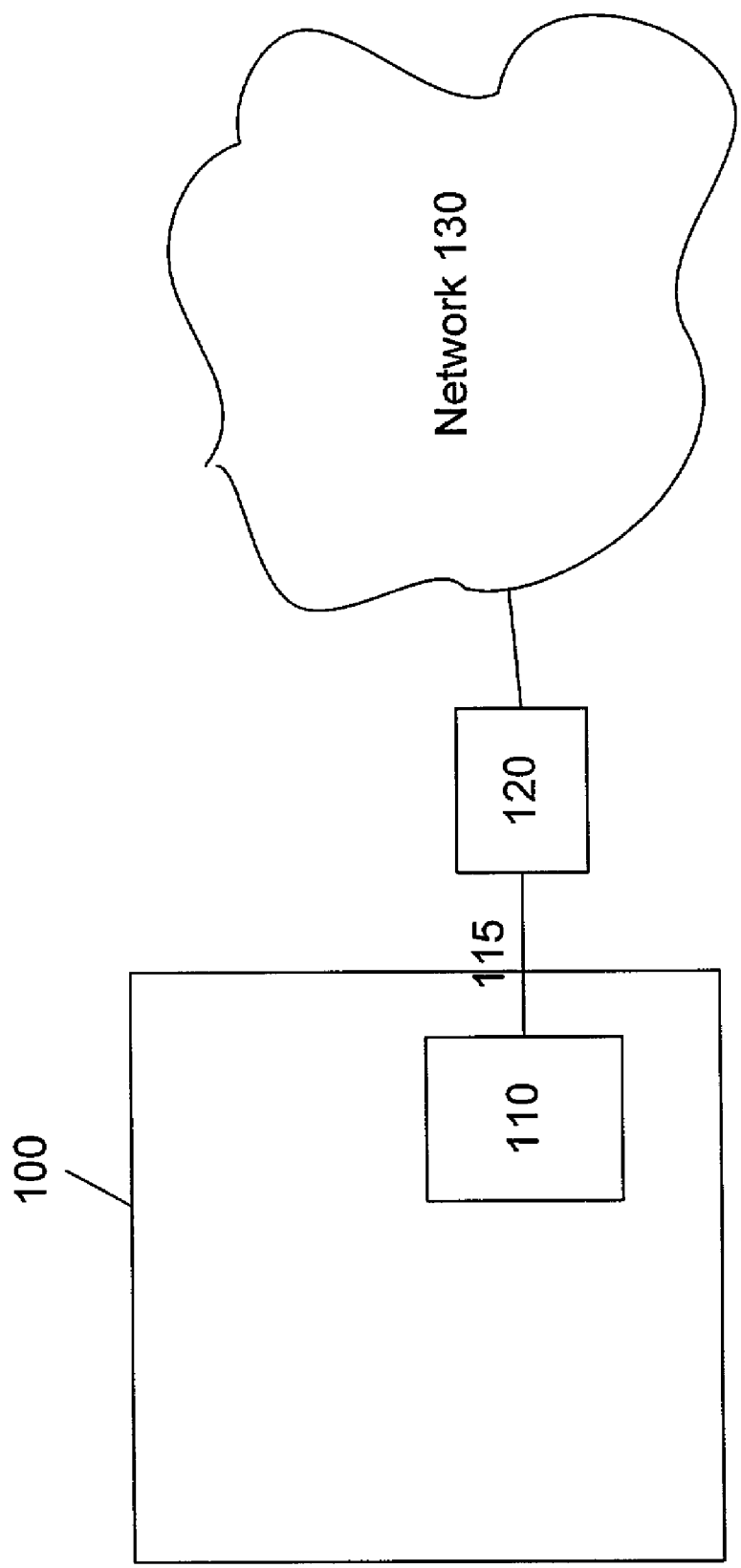
FIG. 1 shows a system upon which embodiments of the invention may be implemented.

FIG. 1 shows a system 100 connected to a network 130 upon which embodiments of the invention may be implemented. System 100 includes a service processor (GSP) 110 in the form of a card plugged in a PCI slot (not shown). GSP 110 includes a network connection 115 connected to a network switch 120, and thus to network 130.

The GSP

In one embodiment, system 100 is a Unix server, and, through appropriate hardware and software, communicates with service processor 110. Similarly, service processor 110 includes hardware and software to provide administrative capabilities to system 100, such as providing event monitor and notification, power management, and access to console of system 100. Service processor 110 acts as a console and front panel display redirector, allowing a user via a console client to have the same set of functionalities and level of controls of system 100. Service processor 110 allows interactions between a console client and program applications on system 100. This console client may be connected to system 100 locally, e.g., through asynchronous links, or remotely, e.g., through a network. Those skilled in the art will recognize that a console is the means from which a user gets access to some specific functions of a computer system, including, for example, checking status of the system, performing system administration, updating system software, configuring system hardware, etc. Normally, a console, being used interchangeably with a terminal, includes a monitor and a keyboard or input device. Service processor 110 also provides system support and management functions for system 100, including providing remote access over a network for managing system 100's boot and reset, providing remote maintenance such as power management, event logs, and event filtering and notifications, etc. In one embodiment, each console client connected to service processor 110 may mirror system 100's console. That is, operations in a console client can be observed in other console clients. Further, service processor 110 is integrated as an input/output (I/O) device to system 100, and acts as an autonomous embedded device, which is powered independently and runs embedded applications independent of system 100's state. System 100 may properly function with or without service processor 110 or with service processor 110 being inoperative. In one embodiment, service processor 110 is commercially available without a terminal, and service processor 110 is referred to as an embedded management processor or device because service processor 110 is part of system 100 and provides management services for system 100.

Service processor 110 includes configurable parameters used to configure service processor 110 to operate with switch 120, and thus with network 130. These parameters include, for example, the desired data speed of network 130, the duplex of network 130, etc., whether the value of the network speed and/or the duplex are non-negotiable or auto-negotiable. Duplex refers to the directions of data being transferred between two devices at a particular point in time. In a full-duplex mode, two devices may concurrently transmit data while in a half-duplex mode, only one device may transmit data at a time. If service processor 110 turns off the auto-negotiate mode, then switch 120 is in a "forced" mode. That is, service processor 110 forces switch 120 to operate with service processor 110 in a specified mode, e.g., setting the speed and/or the duplex to a speed and/or duplex indicated by service processor 110. In one embodiment, when in the forced mode, switch 120 sets the duplex to a default of half duplex. However, if service processor 110 turns on the auto-negotiate mode, then switch 120 may set the speed to the highest speed supported by both service processor 110 and switch 120. In one embodiment, service processor 110 can support both the 10 and the 100Base-T speeds, and if service processor 110 does not advertise that it supports 100Base-T, then it is understood that service processor 110 supports 10Base-T. Service processor 110 includes options for selecting an appropriate duplex, e.g., full duplex, half duplex, etc.

In one embodiment, service processor 110 includes a text user interface that receives configuration commands from a user. These configuration commands are used to set the values for the configurable parameters. Upon receiving a configuration command, the user interface displays choices for the user to select options, including, for example, 10Base-T or 100Base-T, half-duplex or full duplex, non-negotiate or auto-negotiate, etc. Upon receiving the values of selected parameters, the user interface, via appropriate software packages, passes the selected parameters through the network driver that controls the network circuitry of service processor 110. The network driver then passes the parameters to various network layers including the medium access control (MAC) layer and the physical (PHY) layer, which set the values in appropriate registers. Switch 120, via connection 115, may access these parameters as appropriate.

Service processor 110 operates in at least two modes. In the first mode commonly referred to as the console mode, service processor 110 serves as the console for system 110, and while in the second mode or the handler mode, service processor 110, via a control panel, accepts configuration commands. Alternatively, other mechanisms such programming may be used to set the configurable parameters.

Service processor 110 also includes a bootline, which is a segment of memory used to start service processor 110. This bootline may be considered a data structure stored in service processor 10's memory, which, in one embodiment, is non-volatile random access memory (NVRAM). In one embodiment, this bootline stores information related to the network, e.g., the LAN. Because NVRAM can retain data even when the power is turned off, the values of the parameters stored in the bootline may be invoked after each reboot or reset. In one embodiment, these values are invoked when the network driver is loaded, which normally occurs when service processor 110 boots.

In one embodiment, service processor 110 is assigned to network 130 based on the speed of the data transferred service processor 110 and network 130, e.g., 10Base-T, 100Base-T, 1000Base-T, etc.

The Switch

Figure 2:
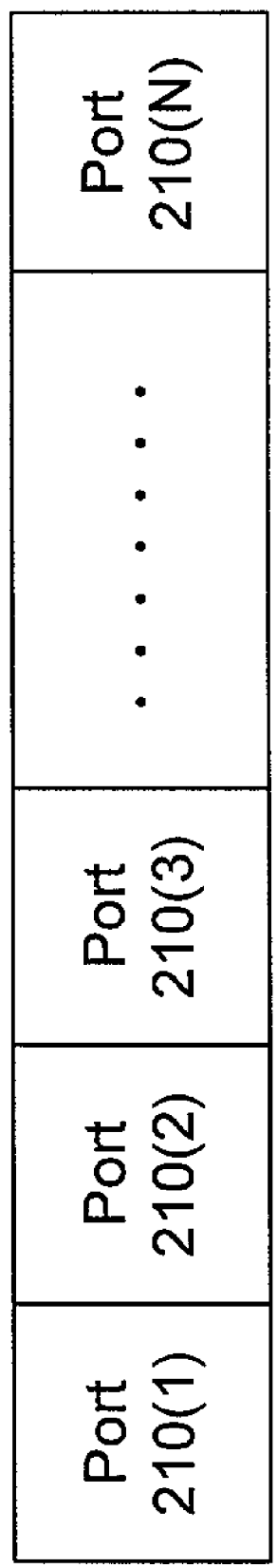
FIG. 2 shows a switch in accordance with one embodiment.

FIG. 2 shows a switch 120, in accordance with one embodiment. Switch 120 includes a plurality of ports 210(1) to 210(N), each of which connects a network device to a network. In the example of FIG. 1, a port 210 connects service processor 110 via connection 115 to network 130. Switch 120, via network 130, may also route the data, usually in the form of packets, between devices. Depending on the situations, before a device can operate in network 130, the device and switch 120 experience a negotiation process to determine the speed and/or the duplex at which the device operates in the network.

In one embodiment, switch 120 supports two networks of two speeds 10Base-T and 100Base-T. Switch 120 uses the data speed to assign a device, e.g., service processor 110, to either the 10Base-T or the 100Base-T network. For example, if service processor 110 is to operate at the 10Base-T speed, then switch 120 assigns service processor 110 to the 10Base-T network. Similarly, if service processor 110 is to operate at the 100Base-T speed, then switch 120 assigns service processor 110 to the 100Base-T network. In one embodiment, once being assigned to a particular network of a particular speed, service processor 110 can only communicate with devices in the same network, but is not allowed to communicate with devices in a different network.

Switch 120 sets the network speed that can be supported by both service processor 110 and switch 120. For illustration purposes, switch 120 can support all speeds supported by service processor 110. Further, switch 120 includes an auto-negotiate option that sets the highest speed advertised by service processor 110. As a result, if service processor 110 advertises that it can support up to 100Base-T, then switch 120 sets the speed to 100Base-T. Similarly, if service processor 110 advertises that it can support up to 1000Base-T, then switch 120 sets the speed to 1000Base-T, etc.

Switch 120 uses the speed desired by service processor 110 when switch 120 is in a forced mode, i.e., switch 120 cannot invoke the auto-negotiate process. For example, if service processor 110 desires a 10Base-T or a 100Base-T, then switch 120 sets the speed to 10Base-T or 100Base-T, respectively. In one embodiment, when in the forced mode, switch 120 does not detect the duplex and defaults to half duplex. In an alternative embodiment, switch 120 may be configured to match the duplex set by service processor 110. Consequently, if service processor 110 desires a half duplex or a full duplex, then switch 120 can be configured to half duplex or full duplex, respectively.

Switch 120 is used as an example, other network controllers that connect a device to a network such as a wireless LAN switch is within the scope of the invention.

Method Steps

Figure 3:
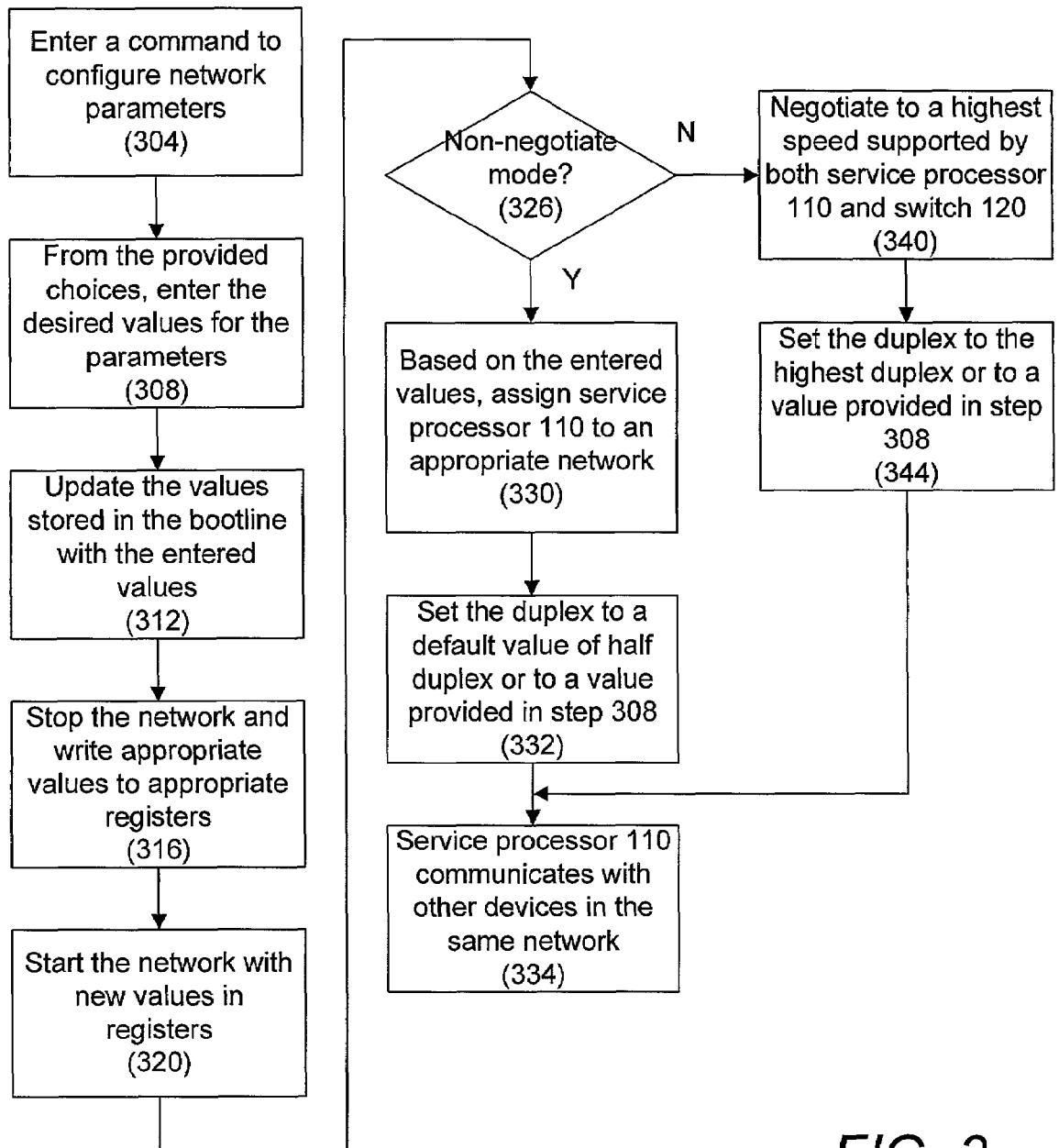
FIG. 3 is a flowchart illustrating a method for configuring a network parameter to a computer.

FIG. 3 is a flowchart illustrating a method for configuring parameters for a device, e.g., service processor 110, to be connected to network 130.

In step 304, a user, via the control panel and the user interface of service processor 110, enters a command to configure the network parameters for service processor 110.

In step 308, from the choices provided from the user interface, the user enters the desired value for the parameter, e.g., 10Base-T, 100Base-T, full duplex, half duplex, non-negotiate, auto negotiate, etc. For illustration purposes, the user selects, non-negotiate, 10Base-T, and full duplex, and it is assumed that the values received from the user are different from those stored in the bootline of service processor 110.

In step 312, service processor 110 updates the values stored in the bootline with the entered values.

In step 316, service processor 110 stops the network and writes appropriate values to appropriate registers, e.g., 10Base-T to the speed register, full duplex to the duplex register, etc.

In step 320, service processor 110 restarts the network with the network registers having the new parameter values.

In step 326, based on the new parameter values set in the appropriate registers, switch 120 via connection 115 and other hardware mechanism, determines whether service processor 110 desires a non-negotiate mode or an auto-negotiate mode.

If service processor 110 desires the non-negotiate mode, then, in step 330, switch 120, based on the detected speed, assigns service processor 110 to the desired network, which, for illustration purposes, is a 10Base-T network. In one embodiment, because in the forced mode, switch 120, in step 332, sets to a default, e.g., of half duplex. In an alternative embodiment, a user manually sets the duplex to a value provided in step 308. However, switch 120 may automatically set this value.

In step 334, service processor 110 freely communicates with other devices in the assigned 10Base-T network.

However, if, in step 326, service processor 110 desires the auto-negotiate mode, then, switch 120, in step 340, sets the speed to a highest speed supported by both service processor 110 and switch 120.

In step 344, in one embodiment, switch 120, in conjunction with the auto-negotiate mode that sets to the highest speed, also sets to the highest duplex supported by both service processor 110 and switch 120. In an alternative embodiment, switch 120 sets the duplex to a value provided in step 308, and, in step 334, service processor 110 is free to communicate with devices to the assigned network.

In the above example, the user had choices to configure network parameters for service processor 110, which is advantageous over other approaches. The user can control which network and/or which duplex for a device, e.g., service processor 110, to operate. This is greatly useful when switch 120 does not allow for setting the network parameters. For example, in one approach, if service processor 110 does not advertise that it can support the 100Base-T speed, then switch 120 forces service processor 110 to 10Base-T and half duplex. However, as seen above, using the configuration techniques of the invention, service processor 110 was set to operate at desired values, e.g., 10Base-T and full duplex, instead of half duplex. Further, during the testing phase of service processor 110, service processor 110 may be configured to, and thus tested with, various combinations of parameter, e.g., auto-negotiate, speed, duplex, etc.

Computer System Overview

Figure 4:
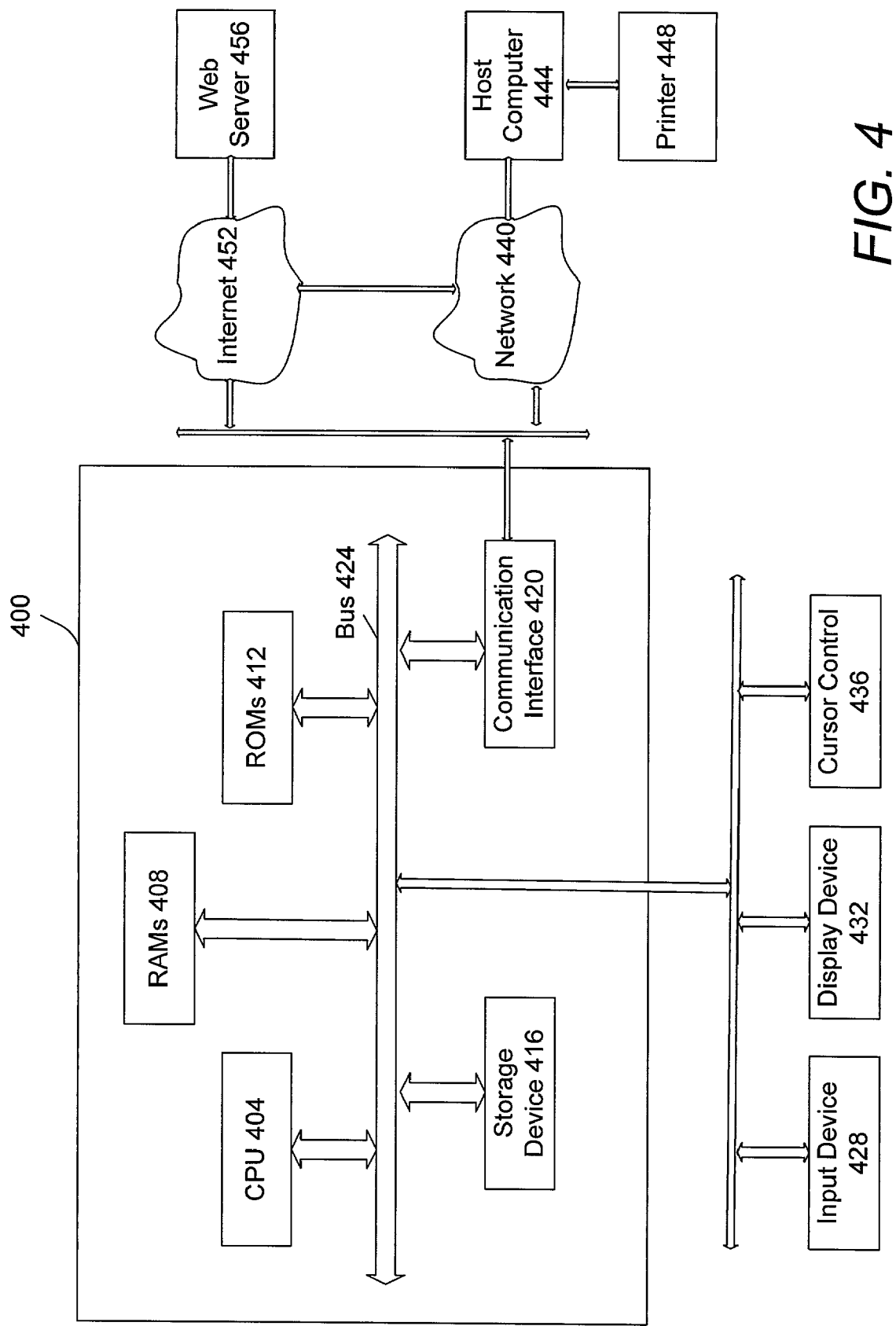
FIG. 4 shows a block diagram of a computer upon which embodiments of the invention may be implemented.

FIG. 4 is a block diagram showing a computer system 400 upon which embodiments of the invention may be implemented. For example, computer system 400 may be implemented to operate as a system 100, to perform functions in accordance with the techniques described above, etc. In one embodiment, computer system 400 includes a central processing unit (CPU) 404, random access memories (RAMs) 408, read-only memories (ROMs) 412, a storage device 416, and a communication interface 420, all of which are connected to a bus 424.

CPU 404 controls logic, processes information, and coordinates activities within computer system 400. In one embodiment, CPU 404 executes instructions stored in RAMs 408 and ROMs 412, by, for example, coordinating the movement of data from input device 428 to display device 432. CPU 404 may include one or a plurality of processors.

RAMs 408, usually being referred to as main memory, temporarily store information and instructions to be executed by CPU 404. Information in RAMs 408 may be obtained from input device 428 or generated by CPU 404 as part of the algorithmic processes required by the instructions that are executed by CPU 404.

ROMs 412 store information and instructions that, once written in a ROM chip, are read-only and are not modified or removed. In one embodiment, ROMs 412 store commands for configurations and initial operations of computer system 400.

Storage device 416, such as floppy disks, disk drives, or tape drives, durably stores information for use by computer system 400.

Communication interface 420 enables computer system 400 to interface with other computers or devices. Communication interface 420 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 420 may also allow wireless communications.

Bus 424 can be any communication mechanism for communicating information for use by computer system 400. In the example of FIG. 4, bus 424 is a media for transferring data between CPU 404, RAMs 408, ROMs 412, storage device 416, communication interface 420, etc.

Computer system 400 is typically coupled to an input device 428, a display device 432, and a cursor control 436. Input device 428, such as a keyboard including alphanumeric and other keys, communicates information and commands to CPU 404. Display device 432, such as a cathode ray tube (CRT), displays information to users of computer system 400. Cursor control 436, such as a mouse, a trackball, or cursor direction keys, communicates direction information and commands to CPU 404 and controls cursor movement on display device 432.

Computer system 400 may communicate with other computers or devices through one or more networks. For example, computer system 400, using communication interface 420, communicates through a network 440 to another computer 444 connected to a printer 448, or through the world wide web 452 to a server 456. The world wide web 452 is commonly referred to as the "Internet." Alternatively, computer system 400 may access the Internet 452 via network 440.

Computer system 400 may be used to implement the techniques described above. In various embodiments, CPU 404 performs the steps of the techniques by executing instructions brought to RAMs 408. In alternative embodiments, hard-wired circuitry may be used in place of or in combination with software instructions to implement the described techniques. Consequently, embodiments of the invention are not limited to any one or a combination of software, firmware, hardware, or circuitry.

Instructions executed by CPU 404 may be stored in and/or carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic or electromagnetic waves, capacitive or inductive coupling, etc. As an example, the instructions to be executed by CPU 404 are in the form of one or more software programs and are initially stored in a CD-ROM being interfaced with computer system 400 via bus 424. Computer system 400 loads these instructions in RAMs 408, executes some instructions, and sends some instructions via communication interface 420, a modem, and a telephone line to a network, e.g. network 440, the Internet 452, etc. A remote computer, receiving data through a network cable, executes the received instructions and sends the data to computer system 400 to be stored in storage device 416.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for assigning a device to a network of a plurality of networks, comprising the steps of:
    providing the plurality of networks, each network having a corresponding speed for data to be transferred between the network and the device;
    providing a first configurable parameter having a first value and a second value;
    configuring the first configurable parameter to a desired value; and
    if the configured desired value of the first configurable parameter corresponds to the first value, then assigning the device to the network based on the speed of data to be transferred between the device and the network by a network controller; the speed of data to be transferred between the device and the network being provided by the device in the form of a second configurable parameter;
    else if the configured desired value of the first configurable parameter corresponds to the second value, then assigning the device to the network based on a negotiated speed provided by a negotiation process between the device and the network controller.

2. The method of claim 1 wherein the negotiated speed provided by the negotiation process corresponds to the highest speed supported by both the device and the network.

3. The method of claim 1 further comprising the step of assigning a duplex to the network based on the second value.

4. The method of claim 1 further comprising the step of assigning a duplex to the network based on a value of a third configurable parameter.

5. The method of claim 1 further comprising the step of assigning a duplex to the network based on a default value of the duplex.

6. The method of claim 1 wherein the network is a local area network.

7. The method of claim 1 wherein the network controller is selected from a group consisting of a network switch and a wireless network switch.

8. The method of claim 1 wherein the device is embedded in a system and provides management services to this system.

9. The method of claim 1 wherein a network of the plurality of networks corresponds to a port and assigning the device to the selected network includes assigning the device to a port corresponding to the selected network.

10. A network comprising:
    a network controller;
    a device coupled to the network via the network controller;
    a first configurable parameter having a first value and a second value;
    a second configurable parameter representing the speed of data to be
        transferred between the network and the device; wherein
    the network controller assigns the device to the network based on a desired value of the first configurable parameter and the speed of data to be transferred between the device and the network, the network having a corresponding speed; and
    if the desired value corresponds to the first value, then the speed of data to be transferred between the network and the device is provided by the device;
    else if the desired value corresponds to the second value, then a negotiated speed is provided by a negotiation process between the device and the network controller.

11. The network of claim 10 wherein the negotiated speed provided by the negotiation process corresponds to the highest speed supported by both the device and the network.

12. The network of claim 10 further comprising a duplex based on a value of a third configurable parameter provided by the device, if the desired value corresponds to the first value.

13. The network of claim 10 further comprising a duplex based on a default value of the duplex, if the desired value corresponds to the second value.

14. The network of claim 10 further comprising a duplex having a value based on the second value.

15. The network of claim 10 wherein the device is embedded in a system and provides management services to this system.

16. The network of claim 10 wherein the network controller is selected from a group consisting of a network switch and a wireless network switch.

* * * * *

UNITED STATES PATENT AND TRADEMARK OFFICE
CERTIFICATE OF CORRECTION

PATENT NO. : 7,281,056 B1 Page 1 of 1
APPLICATION NO. : 10/163290
DATED : October 9, 2007
INVENTOR(S) : John Nolan et al.

It is certified that error appears in the above-identified patent and that said Letters Patent is hereby corrected as shown below:

In column 3, line 65, after "processor" delete "10's" and insert -- 110's --, therefor.

Signed and Sealed this

Twenty-fourth Day of June, 2008

JON W. DUDAS
*Director of the United States Patent and Trademark Office*